United States Patent
Petersen et al.

(10) Patent No.: US 10,409,996 B2
(45) Date of Patent: Sep. 10, 2019

(54) AVOIDANCE OF MALICIOUS CONTENT IN NESTED FILES

(71) Applicant: Cylance Inc., Irvine, CA (US)

(72) Inventors: Eric Petersen, Irvine, CA (US); Derek A. Soeder, Irvine, CA (US)

(73) Assignee: Cylance Inc., Irvine, CA (US)

(*) Notice: Subject to any disclaimer, the term of this patent is extended or adjusted under 35 U.S.C. 154(b) by 198 days.

(21) Appl. No.: 15/613,878

(22) Filed: Jun. 5, 2017

(65) Prior Publication Data

US 2017/0357813 A1    Dec. 14, 2017

Related U.S. Application Data

(60) Provisional application No. 62/347,550, filed on Jun. 8, 2016.

(51) Int. Cl.
    *G06F 21/00*      (2013.01)
    *G06F 21/57*      (2013.01)
    *G06N 20/00*      (2019.01)
    *G06F 21/56*      (2013.01)

(52) U.S. Cl.
CPC .......... *G06F 21/577* (2013.01); *G06F 21/562* (2013.01); *G06F 21/566* (2013.01); *G06N 20/00* (2019.01)

(58) Field of Classification Search
CPC .... G06F 21/562; G06F 21/566; G06F 21/577; G06F 20/00
See application file for complete search history.

(56) References Cited

U.S. PATENT DOCUMENTS

2013/0145466 A1*   6/2013   Richard ................ G06F 21/562
                                                                                            726/23

FOREIGN PATENT DOCUMENTS

EP         2 688 007       1/2014

OTHER PUBLICATIONS

Nissim et al., "Detection of malicious PDF files and directions for enhancements: A state-of-the-art survey," Computers & Security, 48(3):246-266 (2014).

* cited by examiner

*Primary Examiner* — Beemnet W Dada
(74) *Attorney, Agent, or Firm* — Jones Day

(57) ABSTRACT

A nested file having a primary file and at least one secondary file embedded therein is parsed using at least one parser of a cell. The cell assigns a maliciousness score to each of the parsed primary file and each of the parsed at least one secondary file. Thereafter, the cell generates an overall maliciousness score for the nested file that indicates a level of confidence that the nested file contains malicious content. The overall maliciousness score is provided to a data consumer indicating whether to proceed with consuming the data contained within the nested file.

36 Claims, 4 Drawing Sheets

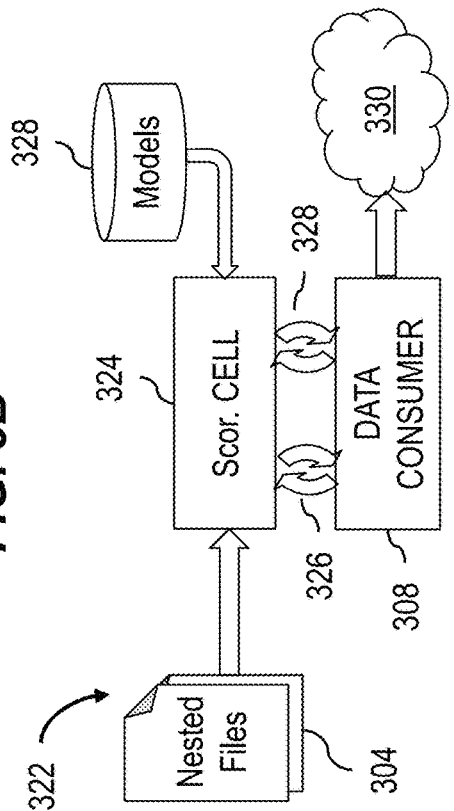
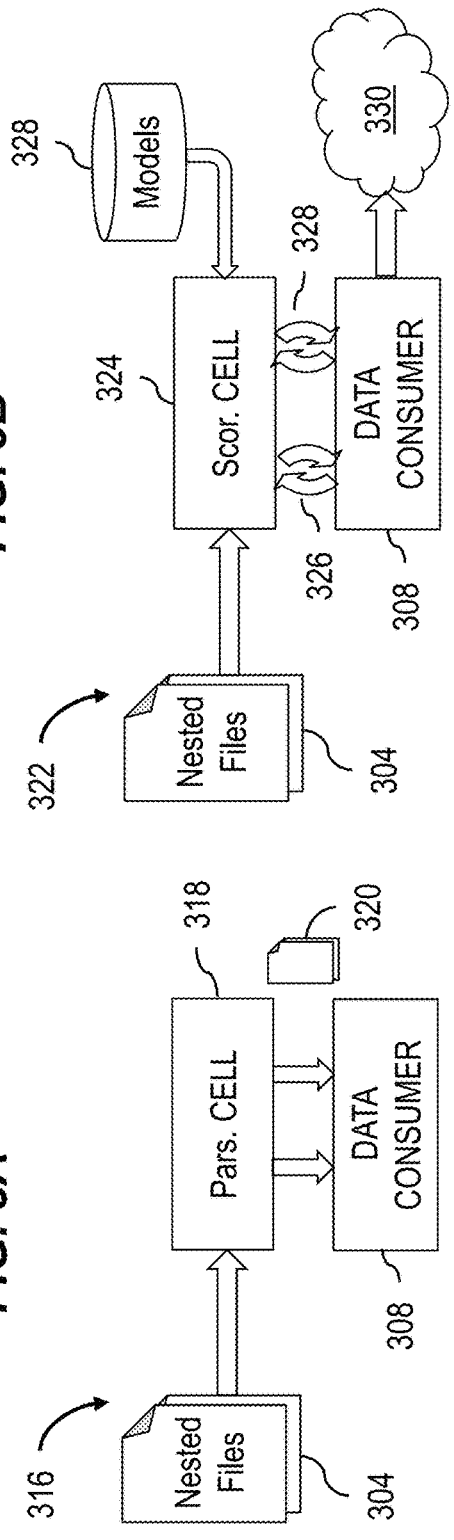
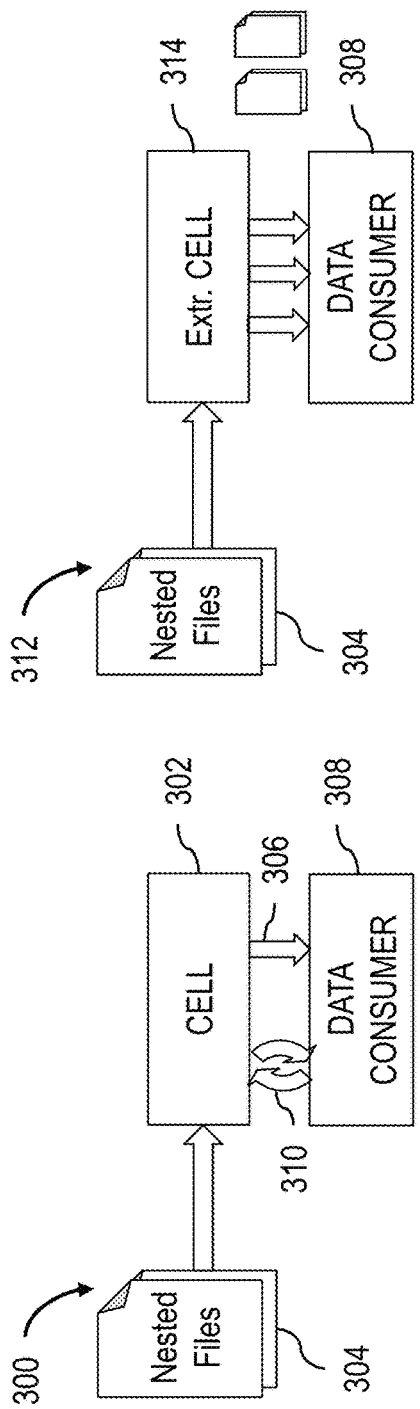

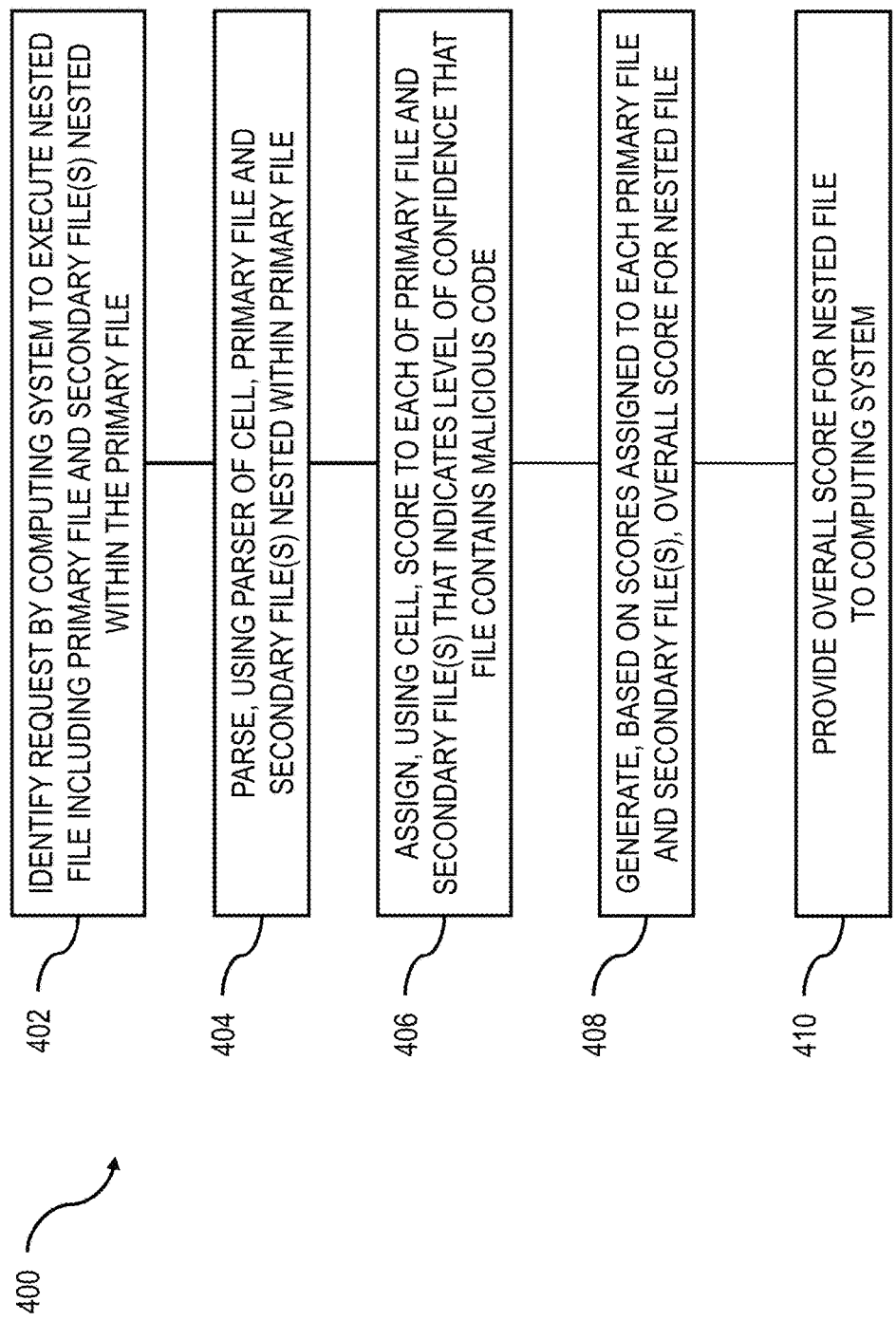

AVOIDANCE OF MALICIOUS CONTENT IN NESTED FILES

RELATED APPLICATION

This application claims priority to U.S. Pat. App. Ser. No. 62/347,550 filed on Jun. 8, 2016, the contents of which are hereby fully incorporated by reference.

BACKGROUND

Computer files are opened by a file parser that is configured to read the file and perform instructions embedded within the file. A parser is generally format-specific. For example, a PDF can be opened by a PDF parser. When a user clicks on a PDF file in order to open the PDF file, the computer system can be configured to dispatch the PDF file to a PDF parser. The PDF parser can receive the PDF file and unpack the content of the PDF file, allowing it to open.

SUMMARY

In one aspect, a nested file having a primary file and at least one secondary file embedded therein is parsed using at least one parser of a cell. The cell assigns a maliciousness score to each of the parsed primary file and each of the parsed at least one secondary file. Thereafter, the cell generates an overall maliciousness score for the nested file that indicates a level of confidence that the nested file contains malicious content. The overall maliciousness score is then provided (e.g., displayed, transmitted to a remote computer system, loaded into memory, stored in physical persistence, etc.). In some variations, provided can include providing the overall maliciousness score to a data consumer indicating whether to proceed with consuming the data contained within the nested file.

In some implementations, the above-noted aspects may further include additional features described herein including one or more of the following. Identifying a request to execute the nested file, the nested file including a primary file and at least one secondary file nested within the primary file. Assigning, using the cell, a maliciousness score to the parsed primary file, the maliciousness score of the parsed primary file indicating a level of confidence that the parsed primary file contains malicious content. Assigning, using the cell, a maliciousness score to each of the parsed at least one secondary file, the maliciousness score of the parsed at least one secondary file indicating a level of confidence that the parsed at least one secondary file primary file contains malicious content. The overall maliciousness score for the nested file can be generated based on the maliciousness scores assigned to each of the primary file and the at least one secondary file. The maliciousness score for the primary file, the one or more secondary files, and/or the nested file can be generated using one or more machine learning models.

The content of the parsed primary file and the at least one secondary file nested within the primary file can be explored using the cell. The exploring of the content of the parsed primary file and the at least one secondary file nested within the primary file can be used to determine a maliciousness score. The primary file can have a first file format. The at least one secondary file can have a second file format. Parsing the primary file can include parsing, using a parser associated with the first file format, the primary file. Parsing the secondary file can include parsing, using a parser associated with the second file format, the at least one secondary file.

The primary file can have a primary file format satisfying a plurality of file formats. Parsing such a primary file can include individually parsing the primary file with parsers associated with each of the file formats satisfied by the primary file. Maliciousness scores for the primary file can be generated for each parsing of the primary file. The one or more secondary files has a secondary file format satisfying a plurality of formats. Parsing such one or more secondary files can include individually parsing the one or more secondary files with parsers associated with each of the file formats satisfied by the one or more secondary files. Maliciousness scores for the one or more secondary files can be generated for each parsing of the one or more secondary files.

The at least one secondary file can have a second file format unknown to the cell. When a file having an unknown format is identified a request can be made to a cloud service accessed over a network to provide parsing information associated with the second file format. The parsing information associated with the second file format can be received from the cloud-computing database over a network. A parser associated with the second file format for parsing files having the second file format can be instantiated using the parsing information associated with the second file format. The at least one second file having the second file format can be parsed using the parser associated with the second file format. The primary file can have a first file format and the at least one secondary file can include a second file having a second file format and a third file having a third file format. The third file can be nested within the second file.

The computing system can be an enterprise server and/or a client device configured to communicate with the enterprise server. The cell can be operated by a secure operating environment logically separate from a primary operating environment of the computer system.

The cell can comprise one or more parsers. The cell can include a dispatcher. The dispatcher can be configured to dispatch at least a portion of the nested file to the one or more parsers. The cell can include a file interface. The file interface can be configured to interface between the cell and a computing platform. The file interface can be configured to expose one or more functions of the cell to the computing platform to receive the nested file from the computing platform and provide information associated with the nested file to the computing platform.

The one or more of the operations as described herein can be performed in a static environment and/or a dynamic environment. A dynamic environment can include a secure operating environment separate from a primary operating environment of the computing system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system or system architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIGS. 3A-3D are diagrams of processing nested files by a system having one or more features consistent with the present description; and, FIG. 4 is a process flow diagram for analyzing data having one or more features consistent with the present description.

DETAILED DESCRIPTION

Figure 1:
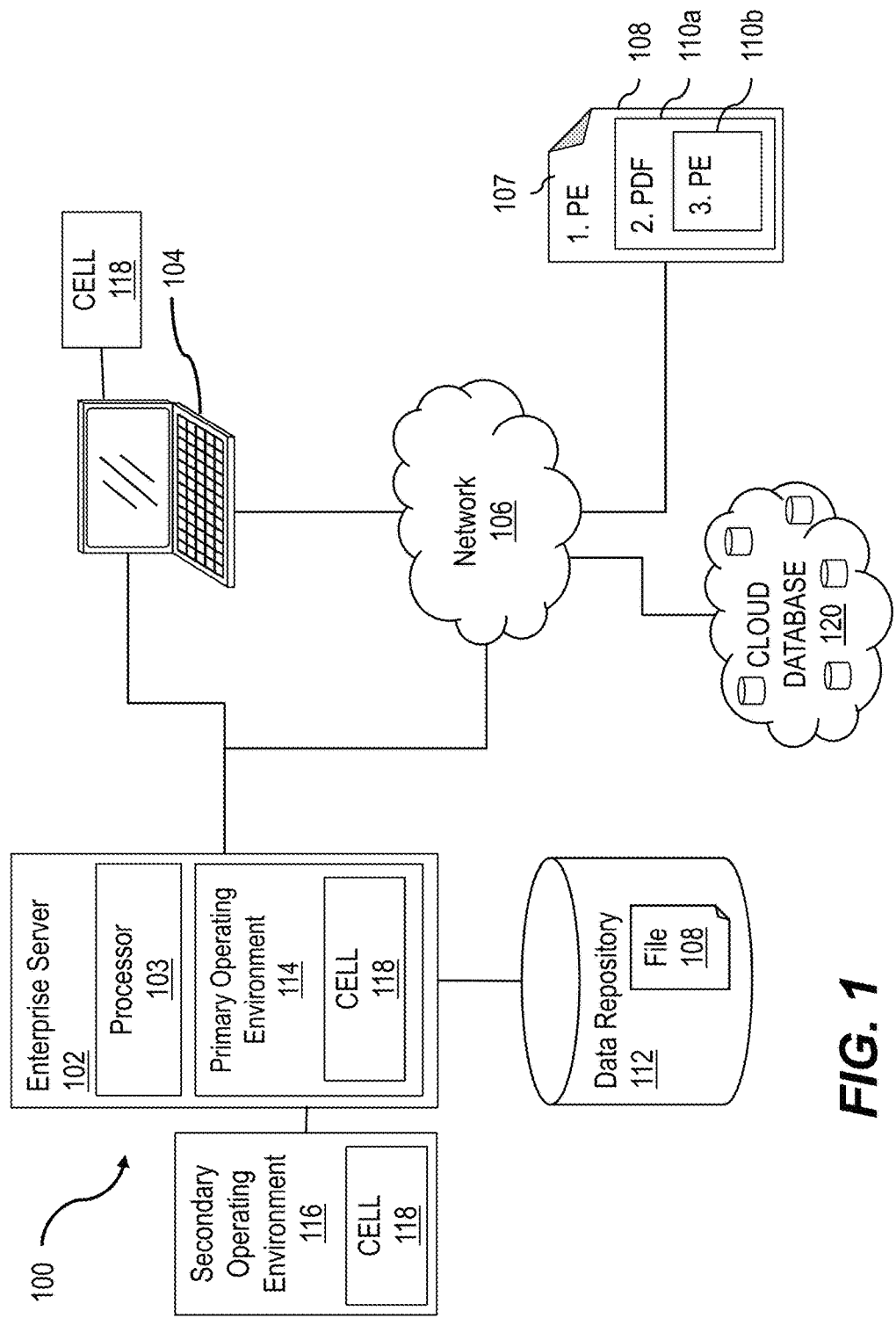
FIG. 1 is an illustration of a system having one or more features consistent with the present description.

A computer file, such as data, a program, a content file, an archive, an executable, a script, or the like, may also include one or more embedded files, which may include data, a program, a content file, an archive, an executable, a script, stream of data, or the like. The computer file and the additional embedded file(s) are referred to herein nested files. The computer file (which may be referred to herein as the outermost file or the primary file) can include one or more embedded files (which may be referred to herein child-files, or secondary files). The nested file may be used to introduce malicious content, such as code configured to cause undesired effects, security breaches, or damage to a computer, into a computer. Malicious code can take the form of any type of data, for example, a program, a content file, an archive, an executable, a script, a stream of data, or the like. The computer can read and analyze the primary file using an analyzer or parser for the format of the primary file. However, if the primary file includes a nested, secondary file having a different format, the analyzer (which is associated with the format of the primary file) may not be configured to read and/or detect the secondary file. The analyzer may thus overlook the existence of the secondary file containing the malicious content causing the computer system to execute the malicious content, causing harm to the computer system.

In some implementations, there is provided a cell configured to detect the existence of a nested file within a computing system and individually parse the individual elements of the file with parsers having formats associated with those individual elements. The cell can be configured to determine a maliciousness score for the primary file and each of the secondary files of the nested cell. The maliciousness score provides a measure of likelihood that an individual element of a nested file contains malicious content. The cell can generate an overall maliciousness score for the nested file based on the maliciousness scores of the individual elements of the nested file.

In some implementations of the presently described subject matter, there may be provided systems, methods and articles of manufacture for enabling the unpacking and examining of nested files to determine whether there is malicious content (e.g., determining a relative safety level of a shell file). A request to access a nested file, by a computing system, can be detected. A cell can be employed to individually parse the primary file and the one or more secondary files of the nested file and generate a maliciousness score for each. The cell can determine an overall maliciousness score for the nested file based on the maliciousness scores for the individual files.

A cell can include one or more processors and an memory storing instructions, which when executed by the one or more processors can cause the one or more processors to detect the existence of a nested file, parse and explore elements of the nested file to determine a likely existence of malicious content with the individual elements of the nested file. The cell can be configured to determine a malicious content score for the individual elements of the nested file and an overall malicious content score for the nested file.

The following description uses examples of nested files to describe the presently described subject matter. The examples may provide specific file types, but this is not intended to be limiting. The presently described subject matter can be applied to a nested file having any type(s) of primary file format and/or any type(s) of secondary file format.

FIG. 1 is an illustration of a computing system 100 having one or more features consistent with the present description. The computing system 100 can include an enterprise server 102 configured to perform one or more enterprise computing functions. Various user devices 104 can communicate with the enterprise server 102. The enterprise server 102 and/or the user device(s) 104 can be configured to communicate with third party computing systems through a network 106, such as the Internet.

The computer system 100 may receive a file to be interacted with. Upon receipt of the file, the computer system can be configured to identify that the file is a nested file 107. The nested file 107 can include a primary file 108 having one or more secondary files 110 embedded within it. For example, the enterprise server 102 and/or user device(s) 104 may receive a nested file 107. The nested file may include a primary file 108 having a plurality of other files with other file formats 110*a* and 110*b* embedded within it. The nested file 107 may be received over a network 106, obtained from a data repository 112 associated with the enterprise server 102, on memory of an enterprise server 102 and/or client device 104, from an external memory device connected to the enterprise server 102 and/or client device 104, or the like.

A primary operating environment 114 of the enterprise server 102 and/or client device 104 may be configured to identify that the received file is a nested file 107. In some variations, in response to detecting the nested file 107, the nested file 107 can be transmitted to a secure operating environment 116. The secure operating environment 116 can be configured to execute one or more files without those files affecting the primary operating environment 114. The secure operating environment 116 may be logically and/or physical separate from the primary operating system 114.

In response to detecting a request to access a nested file 107 by an enterprise server 102, client device 104, or the like, the nested file 107 can be sent and/or copied to a cell 118 that is configured to unpack and examine the nested file 107. The cell 118 can be configured identify which file formats are associated with the nested file 107. For example, the cell 118 can determine the file format of the primary file 108 and each of the one or more secondary files 110a and 110b. While FIG. 1 illustrated a nested file 107 having a primary file 108 having a secondary file 110a nested within the primary file 107 and a secondary file 110b nested within the file 110a, this is not intended to be limiting. A primary file 108 may have multiple different secondary files nested within it at the same level and each of those may have multiple different files nested within them.

The cell 118 can be configured to determine whether the nested file 108 is likely to include malicious content. The cell 118 can comprise, or control, a plurality of parsers, each parser associated with a file or data format. When the cell 118 encounters a file format within the nested file 108, the data associated with that format can be dispatched to the parser associated with the format for unpacking and exploring.

Exploring a nested file can include scanning the file for known signatures (or sequences of signatures), or signatures similar to known signatures (or sequences of signatures), associated with recognized file formats, invoking a parser to identify compartments or regions of the file which may contain an embedded file and decode the regions to permit the cell to examine their contents, and assign or receive from an invoked parser a fidelity which expresses the likelihood that content located by scanning the file or invoking a parser corresponds to a complete and correct expression of an embedded file.

The cell 118 can assign a maliciousness score to each of the files within a nested file 107, wherein the maliciousness score is associated with a determination of how likely the data contained within the file is malicious. Based on the maliciousness scores of each of the files within a nested file 107, the cell 118 can assign an overall maliciousness score to the nested file 107 as a whole. Based on the overall maliciousness score for the nested file 107, the computer system 100 can be configured to determine whether to unpack and explore the nested file in the primary operating system.

On occasion, the cell 118 may identify a file format that it has not previously encountered and is unable to unpack and explore. The computer system 100 can be configured to query a cloud database 120 to determine whether the cloud database 120 can identify the file format. The query can include sending the nested file 107 to a cloud-computing database 120 configured to perform one or more of the functions of the cell 118. The cloud-computing database 120 can send a resulting overall maliciousness score for the nested file 107 back to the computing system 100 and/or send the parsing information associated with the unknown data format back to the computing system 100.

The cell 118 can be operated by one or more of the enterprise server 102, client device 104 and/or other computing system. In some variations, the cell 118 can be operated in a primary operating environment 114 configured to process and analyze potentially malicious files and data. In other variations, the cell and its associated parsers can be located within a secondary operating environment 116 separate from a main operating environment. The secondary operating environment 116 can be a secure operating environment, such as a sandbox environment. In further variations, portions of the cell 118 and its associated parsers may be located partially in the primary operating environment 114 and partially in the secondary operating environment 116.

When malicious content is detected by a secondary operating environment 116, the secondary operating environment 116 can be configured to neutralize the malicious content, or, if the malicious content cannot be neutralized, the secondary operating environment 116 can be configured to reset, or wipe all data, and restart. This can isolate the malicious content from affecting the primary operating system 114 of an enterprise system 10.

Figure 2:
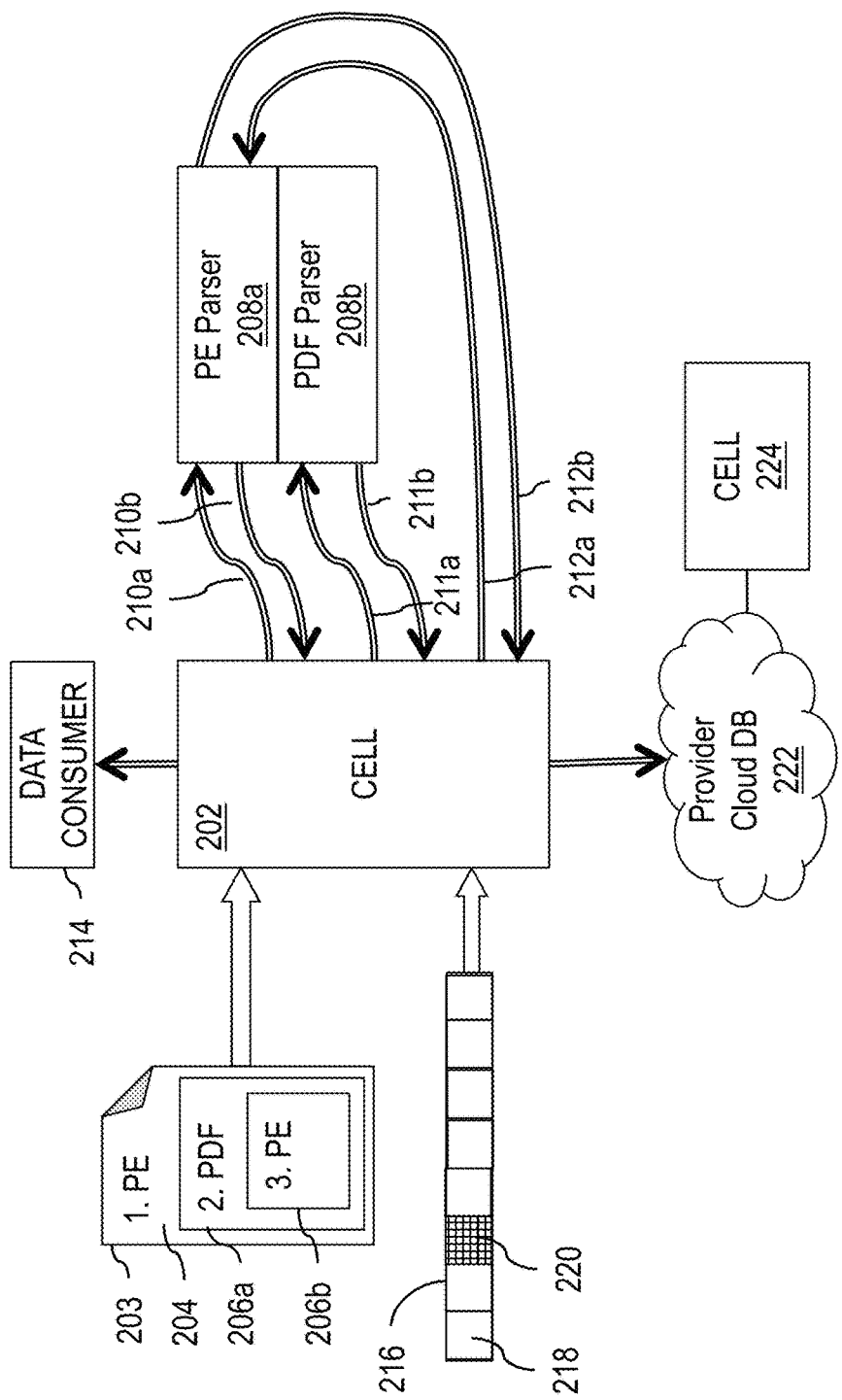
FIG. 2 is a diagram of processing nested files by a system having one or more features consistent with the present description.

FIG. 2 illustrates an exemplary variation of a cell 202 having one or more features consistent with the present description. While the nested file 203 is illustrated and described herein as having portable executable as the primary file 204 and a PDF as the secondary file 206a, with another portable executable file 206b nested with the PDF, this is exemplary only. As previously stated, the presently described subject matter can be applied to a nested file having any file format. In one operation of the presently described subject matter, a nested file 203 can be sent to a cell 202. The nested file 203 may include a primary file 204 and one or more additional files 206a and 206b embedded within it. The cell 202 can be configured to determine the format(s) of the files contained in the nested file 203. In response to determining the formats of the files contained in the nested file 203, the cell 202 can be configured to send the primary file 204 and the secondary file 206a and 206b to parsers 208a, 208b for unpacking and examining.

Using the exemplary variation illustrated in FIG. 2, a primary file 204 can be a portable executable. The portable executable 204 can include a PDF file 206a nested within it. The PDF file 206a can include an additional portable executable file 206b nested within it. Consequently, nested file 204 can include three layers of files having different file formats. The cell 202 can be configured to identify that the primary file 204 is a portable executable file 204 and contains a PDF file 206a and another portable executable file 206b.

The cell 202 can be configured to cause a PE parser 208a to unpack and explore the portable executable files 204 and 206b. The cell 202 can be configured to cause the PDF parser 208b to unpack and explore the PDF file 206a.

The cell 202 may be configured to cause the parsers to unpack and explore the nested files 203 in order of hierarchy. For example, the cell 202 can be configured to identify that the primary file 204, having a primary file format, or first file format, of the nested file 203 is a portable executable file format. At 210a, the cell 202 can be configured to send the portable executable 204 to the portable executable parser 208a. The portable executable parser 208a can be configured to unpack and explore the portable executable file 204. At 210b, the parser 208a can return the unpacked and explored file 204 back to the cell 202. The portable executable parser 208a may provide an indication of an exception where it encountered a file 206a nested within the portable executable file 204. The cell 202 can be configured to assign a maliciousness score to the portable executable file 204 based on the content of the portable executable file 204.

The cell 202 may be configured to identify that the next nested file within the nested file 203 is a PDF file 206a. At 211a, the cell 202 can be configured to send the PDF file 206a to the PDF parser 208b for the PDF parser 208b to unpack and explore the PDF file 206a. At 211b, the PDF parser 208b can be configured to return the unpacked and explored PDF file 206a back to the cell 202. The cell 202 can be configured to assign a maliciousness score to the PDF file 206a based on the content of the PDF file 206a.

The cell 202 may be configured to identify that the next nested file within the PDF file 206a is another portable executable file 206b. At 212a, the cell 202 can be configured to send the portable executable file 206b to the portable executable parser 208a. The portable executable parser 208a can be configured to unpack and explore the portable executable file 206b. At 212b, the portable executable parser 208a can be configured to return the unpacked and explored portable executable file 206b to the cell 202. The cell 202 can be configured to assign a maliciousness score to the portable executable file 206b based on the content of the portable executable file 206b.

The cell 202 can be configured to identify that all files within a nested file 203 have been unpacked and explored by their various parsers. In response to assigning a maliciousness score to each of the files of a nested file 203, the cell 202 can be configured to assign an overall maliciousness score to the nested file 203. In some variations, the overall maliciousness score for the nested file 203 can be a weighted average of the maliciousness scores for each of the files within the nested file 203. For instance, weights could be assigned to each of the primary files 204 and each of the embedded secondary files 206a and 206b based on that file's depth, format, ability or inability to be unpacked or processed by the nested file, and so on. For example, the score assigned to an embedded file of a given format may be assigned a reduced weight if the system responsible for assigning such scores is determined to be more prone to false positives for files of that format, or if a user of the system has determined that files of that format pose a reduced risk in the user's environment. In some variations, the overall maliciousness score for the nested file 203 can be the worst score of the files nested within the nested file 203. For example, the nested file 203 may be assigned a score based on the portable executable file 206b having a high likelihood of containing malicious content.

The primary file 204 and/or secondary file(s) 206a and 206b may be selectively parsed and/or scored. The cell 202 may be configured to strike a balance between completeness of unpacking and exploring the nested file 203 and maintaining performance of a computer system. The cell 202 may be configured to follow a set of parsing rules dictating what it will and will not parse. For example, there may be a time limit imposed on the cell 202. If the cell 202 cannot parse the primary file 204 and/or the secondary files 206, of the nested file 203, the cell 202 can be configured to dispatch the nested file 203 to one or more data consumers configured to perform additional analysis on the nested file 203.

A constraint on the cell 202 can include the number of levels of embedded files within a nested file 203. When the nested file 203 has a number of levels of embedded files that is greater than an embedded file level threshold, then the cell 202 can be configured to assign a score to the nested file 203 indicating that it has a high likelihood of including malicious code. For example, the cell 202 may have a nesting level limit of three levels. When there is an embedded file in the third level of a nested file, making that nested file have four nesting levels, the cell 202 can be configured to assign the nested file an overall maliciousness score indicating that nested file has a high likelihood of containing malicious content.

When the nested file 203 has an overall maliciousness score indicating that it contains a high likelihood of containing malicious content, the cell 202 can dispatch the nested file 203 to a data consumer. The cell 202 may be configured to select the data consumer based on the overall maliciousness score, or another component(s) of the computing system may be configured to select the data consumer based on the overall maliciousness score. The data consumer can be configured to perform additional malicious content analysis on the nested file 203. The additional malicious content analysis can include, for example, quarantining the nested file, prohibit the nested file from interacting with the computer, analyzing the code of the nested file to determine the intent of the nested file, or the like.

The cell 202 can be configured to update metadata of the nested file 203 to include the overall maliciousness score for the nested file 203. The metadata can be read by one or more computing systems, indicating to those computer systems the likelihood of the nested file 203 containing malicious content. Over time, the file may be amended and the risk of malicious content being introduced into the file can increase. The metadata for the nested file 203 may include a timestamp, a time limit, or the like. When the timestamp is older than a set time decided upon by an administrator, or upon expiration of the time limit, the nested file 203 can be flagged as being subject to reprocessing by the cell 202. Prior to the expiration of any deadline, the nested file 203 may be repeatedly accessed without being rescanned by the cell 202.

In some variations, the metadata can include an indication of the frequency at which an associated file has been accessed, an amount of times an associated file has been accessed, an indication of the users or types of users that have accessed a file, or the like. In response to the metadata associated with a nested file meeting one or more criteria, the nested file may be flagged as requiring processing by the cell 202. The overall maliciousness score for the nested file 203 can be a sum of the maliciousness scores for each of the elements of the nested file 203.

In response to a nested file being flagged for processing by the cell 202, the nested file can be immediately queued for processing by the cell 202. In some variations, the flagged nested file may not be processed until a client device, such as client device 104, an enterprise server, such as enterprise server 102, or the like, requests to access the nested file.

A data consumer 214 can be configured to make use of the information contained within the nested file 203. The data consumer 214 can be part of the operating environment in which the cell 202 is operated.

In some variations, the nested file 203 can be passed to a data consumer 214 after the overall maliciousness score for the nested file 203 has been determined. The cell 202 can be configured to provide the unpacked and explored nested file 203 to the data consumer 214, send the original packed and non-explored nested file 203 to the data consumer 214, or provide a notification to the data consumer 214 to proceed with unpacking and examining of a copy of the nested file 203 that had been stored in the computer system in which the data consumer 214 has been operated.

Upon receipt of the nested file 203 or an indication that the nested file 203 has been processed by the cell 202, the data consumer 214 can determine how to proceed with the nested file 203 based on the overall maliciousness score for the nested file 203. Where the nested file 203 has an overall maliciousness score indicating that the nested file 203 is unlikely to have malicious content, the data consumer 214 can be configured to allow access to the nested file 203. Access can be granted to a server, such as server 102, client device, such as client device 104, or the like. Where the nested file 203 has an overall maliciousness score indicating that the nested file 203 is likely to have malicious content, the data consumer 214 can be configured to reject the nested file 203.

A nested file 203 can be analyzed using one or more static analysis operations. Some of the operations described in the preceding paragraphs can be attributed to static analysis of the nested file 203. The nested file 203 can also be analyzed dynamically, whereby the files, or sections thereof, are executed, at least in part, to determine the content of the files. For example, a self-extracting archive can be identified as including encrypted data, but the intent of that data cannot be identified easily without executing the self-extracting archive. To determine the content of the nested file 203, or a part thereof, the nested file 203, or a portion of the nested file 203, can be dynamically analyzed to determine the intent of the content.

Dynamically analyzing the nested file 203 can include executing the nested file 203, or a portion thereof, in the application's native environment. The execution of the application can be limited such that as soon as sufficient information is obtained to determine the intent of the content, the application is halted. In some variations, the nested file 204, or a portion thereof, can be provided to a quarantined environment. For example, the computing system operating the data consumer 214 can be configured to deny access to nested file 203 by the data consumer 214 in response to an indication that the nested file 203 has an overall maliciousness score indicative of a likelihood of including malicious content. In some variations, the data consumer 214 can be configured to quarantine the nested file 203 based on the overall maliciousness score of the nested file 203.

Quarantining the nested file 203 can include one or more actions. For example, the nested file 204 may be sent to a sandbox environment, or secure operating environment, that is separate from the primary operating environment of the consumer computing system. The sandbox environment can allow unpacking and examining of the nested file 203, in its entirety, to see its effect on the sandbox environment. In some variations the sandbox environment can be a replica of the primary operating environment of the computing system on which access to the nested file was initially requested. Sensitive data may not be included in the sandbox environment, but processing functionality, and the like, may be. A sandbox environment may be generated for each nested file 203 having an overall maliciousness score indicative of the existence of malicious content. In some variations, the sandbox environment may be configured to allow multiple nested files to be unpacked and explored within it so that a combined effect can be analyzed. This may be the case where one nested file has a link to, or performs an action on, another file, including other nested files.

In the event that the unpacking and examining of the nested file, under suspicion of containing malicious content, has no adverse effects on the sandbox environment, the consumer computing system 214 may be configured to permit access to the file by one or more of the enterprise server, client device, or the like.

In some variations, the cell 202 can be configured to quarantine the suspect nested file 203. The cell 202 may provide an indication to the data consumer 214 that the nested file 204 has been quarantined. If a copy of the nested file 204 exists within the computing system operating the data consumer 214, the computing system can be instructed to discard that copy of the nested file 203. The data consumer 214 can provide a notification to an administrator or a user of the computing system, operating the data consumer 214, indicating that the nested file 203 has been quarantined and is not safe for interaction.

In some variations, the cell 202 may be, or may operate within, a quarantined environment or secure environment, such as secure environment 116 illustrated in FIG. 1.

In some variations, the nested file may be seen as a block(s) of data having a first format with a block(s) of data having a second format within the file. For example, a nested file 216 may be comprised of multiple blocks of data 218. The blocks of data 218 may have a first format comporting with a header of a nested file 216. Within the nested file 216 there may be blocks of data 220 having a second format that does not comport with the header of the file 216. The blocks of data 220 having a second format may have their own headers comporting with the format of the second-format blocks of data 220. The cell 202 can be configured to send at least the blocks of data having the first format 218 to a first parser associated with the first format, and the blocks of having the second format 220 to a second parser associated with the second format.

The cell 202 may be implemented by a purchaser of data security systems. The cell 202 may be implemented by or on computing systems operated by the purchaser of data security systems. In some variations, the computing systems operated by the purchaser of data security systems may have a secure operating environment in which the cell 202 is implemented.

In some situations, the cell 202 may not know the format of a file, or data, within a nested file. The cell 202, operated by a consumer computing system of a purchaser of data security systems, may not have been updated with the latest protocols. The latest protocols can include support for new formats or updated versions of existing formats. When the cell 202 cannot identify the format of a file, or data, within a nested file, the cell 202 can be configured to query a provider cloud database 222. A provider cloud database 222 can be a database that is operated by a provider of data security tools purchased by the operator of the computing system that operates the cell 202. The provider cloud database 222 can include a repository of all known file formats, data formats, and types. The cell 202 may access the provider cloud database 222 through a network. For example, with reference to FIG. 1, the computing system operating the cell 118 can be configured to facilitate access to the provider cloud database 120 through a network 106.

In some variations, in response to the query by the cell 202, the provider cloud database 222 can be configured to determine the file format or data format and transmit the protocols associated with that format to the cell 202. The protocols can a specification or program code that implement support for a particular format. The protocols can include parser and scoring definitions for unpacking and examining files of that format.

In some variations, the provider cloud database 222 can include a cell 224 similar to cell 202. The query from the cell 202 can include the nested file 204, at least a portion of which has an unknown format. The cell 224 of the provider cloud database 222 can be configured to unpack and explore the nested file 204 using a parser having a format associated with the format unknown by the cell 202. The cell 224 of the provider cloud database 222 can be configured to generate maliciousness scores for the elements of the nested file in a similar manner described with respect to cell 202. The resultant maliciousness score for the individual elements of the file 203 and/or the overall maliciousness score the file 203 can be transmitted back to the cell 202.

In some variations, the cell 224 of the provider cloud database 222 can be configured to unpack and explore only the portions of the file 204 that have a format unknown by the cell 202. This can reduce processing overhead on the provider cloud database 222 which may be receiving multiple queries and/or requests from multiple purchasers of data security systems.

If the provider cloud database 222 has not previously encountered the format of the file and/or data, the provider cloud database 222 can be configured to flag the file and/or data for further processing. Further processing can include manual examination of the file and/or data by a software engineer, the application of a machine learning model on the file and/or data to determine how to unpack and explore the file and/or data, or the like.

The provider cloud database 222 can provide services to multiple cells 202. The provider cloud database 222 can include machine-learning models configured to learn additional file formats and/or data formats based on the queries and flags received from each of the cells 202. In response to uncovering ways to unpack and explore file formats and/or determining maliciousness scores for previously unknown file formats, the provider cloud database 222 can be configured to push the learned methods and features to the cells 202.

The cell 202 operated can be configured to provide alerts to the provider cloud database 222 when it detects unsafe files and/or files with characteristics that justify further tracking, such as files that contain key-logger code or BIOS update code or self-extracting archives or encrypted payloads. This information can be used by the provider cloud database 222 to detect patterns experienced by the plurality of cells 202 reporting information to it. When multiple cells 202 report similar activity, it can be indicative of the existence of a new cyber security threat. The provider cloud database 222 can send signals to the cells 202 to be on high alert when a new threat or attack is detected. When solutions to new cyber security threats are discovered, cells 202 can be automatically updated from the provider cloud database 222.

The cell 202 can be configured to query the provider cloud database 222 before, after, or concurrent with processing a nested or embedded file. In some cases, the provider cloud database 222 may already possess equivalent or superior information about a file, which it could supply to the cell 202 to obviate the need to perform processing by the cell 202. In other cases, the provider cloud database 222 may not have information about a file but may have superior processing capacity which enables it to receive, process, and respond to a query in less time than the cell 202 would spend processing the file 203. Future queries about a file could be serviced by the provider cloud database 222 without reprocessing the file due to the retention of cached results from a previous processing.

A cell can include hardware, software, firmware, and/or the like, components configured to analyze data within a nested file format and orchestrate unpacking and examining of nested files to determine a likelihood of those files containing malicious content. The cell can assign a maliciousness score to individual files and/or individual elements of a nested file and assign an overall maliciousness sore for the overall nested file.

One core variations of a cell can comprise a set of parsers associated with various file and data formats, a dispatcher responsible for sending data to one or more parsers, and an interface that exposes functionality of the cell to a platform (for example, an operating system, an application, a service, or a data consumer), accepts functionality offered by the platform, and sends notifications to the platform as appropriate. Examples of functionality offered by the cell include processing a file, aborting the processing of a file, accessing a file embedded in a nested file according to an identifier, and configuring the cell. Examples of platform functionality accepted by the cell include obtaining access to a file according to an identifier, allocating temporary storage, issuing diagnostic messages, and querying a database provided by the platform. The cell may include other interfaces, such as an interface that communicates with a provider cloud database. Other embodiments of a cell may be derived from this core and adapted to special purposes, as will be discussed below.

Some of the examples described herein refer to a nested file having a portable executable (PE) file format and a secondary file having a PDF format. This is exemplary only. The current subject matter can be applied to nested files of any format and configuration. Any file format may be used as the primary file format or the secondary file format in a nested file. File formats for the primary and/or secondary files may include a content-format file, examples of which include PDF, RTF, PostScript, XPS, OOXML, .doc, docx, .xls, .xlsx, ppt, pptx, or the like. File formats for the primary and/or secondary files may be executable files, examples of which include a portable executable, executable, Windows PE, MachO (Mac OS), ELF, and/or UNIX/LINUX executable file formats. Primary and/or secondary files may include files having scripting language file formats, for example, JavaScript, Visual Basic, AutoIt, or the like, that do not require compilation to run in a local environment. Primary and/or secondary files may include files having intermediate language or bytecode formats, for example, Java, .NET, Common Intermediate Language (CIL), Microsoft Intermediate Language (MSIL), or the like, that that utilize Just In Time (JIT) compilation to run in a local environment. File formats may include archive formats, for example, .zip, .gzip, .rar, .7z, .tar, or the like. Primary and/or secondary files may be streams of data, for example web traffic streamed from the Internet, streams of data over a private or semi-private network, streams of data over public WiFi, or the like. These streams of data can contain various network communication protocols and scripting languages, including HTTP, HTML, JavaScript, or the like, that communicate how to present information in a web browser or client application, or how to distribute files using a network file system such as Network File System (NFS) or Server Message Block (SMB) or Common Internet File System (CIFS) or Apple File Protocol (AFP). To summarize, the file formats of the primary files and secondary files can be any file format or network communications protocol.

The primary and/or secondary files of a nested file may not be limited to having characteristics of one file format. The file format of the primary file or secondary file(s) of a nested file can include files having a format that match multiple file-format types. For example, DICOM (a medical imaging file format) may have an empty region at the beginning of the file to facilitate inclusion of code that allows the DICOM file to be read as many different file formats, for example, as one or more of DICOM, JPG, MPEG, or the like.

FIGS. 3A-3D illustrate exemplary variations of cells having one or more features consistent with the present description.

FIG. 3A is an illustration 300 of a cell 302 for unpacking and examining nested files 304. At 306, the cell 302 can be configured to provide metadata about the unpacked and examined nested file 304 to a data consumer 308. At 310, callbacks between the cell 302 and the data consumer 308 can occur. The data consumer 308 can attempt to unpack and explore a file. During unpacking of the file, the data consumer 308 can be configured to send the file to the cell 302 in response to detecting that the file is a nested file 304 (including the case that it cannot be determined whether the file is a nested file). The cell 302 can identify the internal file, determine a maliciousness score and assign the maliciousness score to that part of the nested file 304 and return it to the data consumer 308. The data consumer 308 can carry on unpacking and examining the file 304 until it encounters another nested file. The data consumer 308 can return the nested file back to the cell 302 for further processing. This can repeat until the entire file is unpacked and examined and an overall maliciousness score can be generated for the file.

FIG. 3B is an illustration 312 of an extraction cell 314. The extraction cell 314 can be configured to unpack and examine all of the elements of the nested file 304 prior to providing the nested file to the data consumer 308. The extraction cell 314 can be configured to unpack and explore each file and/or each data packet of the nested file 304. The extraction cell 314 can then provide the unpacked and examined individual elements of the nested file 304 to the data consumer 308. In some variations, the extraction cell 314 can be configured to extract the portion of the nested file that has a relatively high likelihood of being malicious content. The extracted malicious content can be sent to a sandbox environment for further analysis.

FIG. 3C is an illustration 316 of a parsing cell 318. The parsing cell 318 can be configured to parse each of the elements of the nested file 304. The unpacked and parsed elements of the nested file 304 can be provided to the data consumer 308 as data representing the nested file 320 in a format which is more readily understood by the data consumer 308 or its clients than the original format.

FIG. 3D is an illustration 322 of a scoring cell 324. At 326, the data consumer 308 can request access to a nested file 304. The scoring cell 324 can be configured to generate a maliciousness score for the files within the nested file 304. At 326, the scoring cell can be configured to provide the unpacked file to the data consumer 308. The scoring cell 324 can be configured to use one or more scoring models from a scoring model database 328 to determine a maliciousness score for the different elements of the nested file 304. At 328, the scoring cell 324 can communicate the maliciousness score to the data consumer 308. The scoring cell 324 can also be configured to indicate to the data consumer 308 when the scoring cell 324 cannot identify a format of an element within the nested file 304. The data consumer 308 can be configured to consult a provider cloud database 330 to request whether the provider cloud database 330 can recognize the file format of the unknown element of the nested file 304.

The malicious content scoring models can include machine learning models. Machine learning models can be implemented using software, hardware, firmware, and/or the like. The one or more malicious content scoring machine learning models can each be a mathematically based understanding of a particular situation and one or more algorithms defined to determine an outcome from a particular input against the model. In some variations, an ensemble of machine learning models can be used which is a collection of models utilized in a particular way to generally improve accuracy or reduce variance.

The ensemble of machine learning models can be devised and trained using the sandbox environments of the provider of the cyber security system, consumers, and/or the like. Due to the predictive nature of various machine learning algorithms, a trained model can allow a "fuzzy" match against safe and unsafe data. By carefully selecting and training the models in the ensemble, the system can act resiliently against change over time, accommodating small and large changes in program behaviors that resemble "safety" or a lack thereof. A machine learning model may be characterized by an algorithm it incorporates, which may include, as an example, neural networks, support vector machines, logistic regressions, scorecard models, Bayesian algorithms, decision trees, and/or the like. A machine learning model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data. Reinforcement learning represents a third process for training a model.

The use of ensembles of machine learning models allows multiple, distinct machine learning models to be tailored to suit more specialized combinations of features within the more common types of programs. Each sample can be approached with a machine learning model that is more appropriate for its type. In addition to model specificity, the general ensemble can offer multiple different learning algorithms per model. This allows sample discernment to benefit from multiple different assessments. Some specific models have lower error rates for particular algorithms, and combining them in a weighted manner helps achieve the highest results.

Ensemble machine learning models and/or their outputs can be combined using individualized measured error rates in a weighting scheme (such as a scorecard model). Each machine learning model that provides a maliciousness score can be normalized and adjusted by its measured error rate. This final combination allows for the most accurate understanding from a variety of sources.

FIGS. 3A-3D are illustrated and described separately for discussion purposes only. However, a single cell can perform some or all of the various functions described with respect to any of the cells of FIGS. 3A-3D. For example, a cell may have some or all of the functionality of cell 302, cell 314, cell 318 and/or cell 324.

The enterprise system components can include one or more processors 103. The processor(s) 103 is configured to provide information processing capabilities to a computing device having one or more features consistent with the current subject matter. The computing device can be, for example, enterprise server 102, data repository 112, user terminal 104, or the like. The processor(s) 103 may include one or more of a digital processor, an analog processor, a digital circuit designed to process information, an analog circuit designed to process information, a state machine, and/or other mechanisms for electronically processing information. In some implementations, the processor(s) 103 may include a plurality of processing units. These processing units may be physically located within the same device, or the processor(s) may represent processing functionality of a plurality of devices operating in coordination. The processor(s) 103 may be configured to execute machine-readable instructions, which, when executed by the processor(s) 103 may cause the processor(s) 103 to perform one or more of the functions described in the present description. The functions described herein may be executed by software; hardware; firmware; some combination of software, hardware, and/or firmware; and/or other mechanisms for configuring processing capabilities on the processor(s).

The electronic storage device 112 may comprise electronic storage media that electronically stores information. The electronic storage media of electronic storage 104 may include one or both of system storage that is provided integrally (i.e., substantially non-removable) with a computing device, such as the enterprise server 102, and/or removable storage that is removably connectable to the enterprise server 102 via, for example, a port (e.g., a USB port, a firewire port, etc.) or a drive (e.g., a disk drive, etc.). Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 104 may include one or more virtual storage resources (e.g., cloud storage, a virtual private network, and/or other virtual storage resources). Electronic storage 112 may store software algorithms, information determined by the processor(s), information received from one or more computing devices, such as enterprise server 102, user terminal 104, information that enables the one or more computing device to function, or the like.

FIG. 4 illustrates a method 400 having one or more features consistent with the current subject matter. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400. The description of FIG. 4 also refers to FIGS. 1 and 2.

At 402, a request made by a computing system to execute a nested file can be identified. The nested file can include a primary file and at least one secondary file embedded within the primary file. For example, computing system 100 can identify a request to execute nested file 107 has been made by the client device 104, the server 102, and/or other computers. The nested file 107 can include a primary file 108 and at least one secondary file 110a and 110b embedded within the primary file.

At 404, the primary file and the at least one secondary file nested within the primary file can be parsed by a cell. Parsing of the primary file and the at least one secondary file can be performed by separate parsers. For example, parsing of the primary file can include parsing the primary file having a first file format using a first parser associated with the first file format and parsing of the at least one secondary file can include parsing the at least one secondary file having a second file format with a second parser associated with the second file format. For example, the primary file 204 and the at least one secondary file 206a and 206b embedded within the primary file 204 can be parsed by parsers 208 and 208b. The primary file 204 and the secondary file 206b can have a first file format and be parsed by a parser 208a associated with the first format. The secondary file 206a can have a second file format and be parsed by a parser 208b associated with the second file format.

Parsing of the elements of the nested file can include unpacking the nested file and exploring the nested file. In some variations, each of the elements of the nested file can be unpacked and explored separately.

At 406, a maliciousness score can be assigned, by the cell, to each of the primary file and the at least one secondary file. The score can indicate a level of confidence that the file contains malicious content. For example, the cell 202 can be configured to assign a maliciousness score to the primary file 204, the secondary file 206a and the secondary file 206b. In one example, the primary file 204 may be a Microsoft Installer (MSI) format file containing a secondary file 206 which is a Microsoft Cabinet (CAB) archive, and the secondary file may contain multiple additional secondary files 206 which may be compressed EXE and DLL files, which are Portable Executable (PE) format files. In this example, a DLL file may be determined, by a machine learning model, to be malicious with a 95% confidence level, while the other EXE and DLL files may be determined to be benign with a 99% confidence level.

At 408, an overall maliciousness score for the nested file can be generated. The overall score can be based the scores assigned to each of the primary file and the at least one secondary file. The overall score can indicate a level of confidence that the nested file contains malicious content. For example, for example the cell 202 can be configured to generate an overall maliciousness score for the nested file 203 based on the maliciousness score for the primary file 204 and the secondary files 206a and 206b. Continuing the above example, the presence of a DLL file having a maliciousness score of 95% may cause the CAB file to be determined as being malicious with a 90% confidence level. This in turn may cause the MSI file to be determined as malicious with a 90% confidence level, i.e., the MSI file is assigned an overall maliciousness score indicating a high likelihood of maliciousness. In an alternative example, the EXE and DLL files may be determined as benign at a 99% confidence level, while the MSI itself may be determined as being malicious (for instance, due to the presence of other malicious data embedded within it) at a 99% confidence level, and therefore the overall score indicates a high likelihood of maliciousness.

At 410, the overall maliciousness score for the nested file can be provided to the computing system that requested access to the nested file. For example, the cell 118 can be configured to provide the overall maliciousness score for the nested file 107 to the enterprise server 102, the primary operating environment running on the enterprise server 102, the client device 104, the secondary operating environment 116, or the like.

Without in any way limiting the scope, interpretation, or application of the claims appearing herein, a technical effect of one or more of the example embodiments disclosed herein may include the detection of malicious content within nested files and providing a maliciousness score to the various elements within a nested file. Without in any way limiting the scope, interpretation, or application of the claims appearing herein, a technical effect of one or more of the example embodiments disclosed herein may include facilitating detection of malicious content within nested files while still allowing the consumer computing device to execute the nested file.

One or more aspects or features of the subject matter described herein can be realized in digital electronic circuitry, integrated circuitry, specially designed application specific integrated circuits (ASICs), field programmable gate arrays (FPGAs), graphics processing units (GPUs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and can interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-implemented method for processing a nested file having a primary file and at least one secondary embedded within the primary file, the method comprising:
parsing, using at least one parser of a cell, both of the primary file and the at least one secondary file;
assigning, using the cell, a maliciousness score for the parsed primary file and the parsed at least one secondary file;
generating, by the cell, an overall maliciousness score for the nested file, the overall maliciousness score based on at least one of the assigned maliciousness score for the parsed primary file and the parsed at least one secondary file, the overall maliciousness score indicating a level of confidence that the nested file contains malicious content; and providing, the overall maliciousness score to a data consumer indicating whether to proceed with consuming the nested file;
wherein the at least one secondary file has a second file format unknown to the cell and the operations further comprise:
identifying, by the cell, that the second file format is unknown to the cell;
requesting, from a cloud service accessed over a network, parsing information associated with the second file format;
receiving, from the cloud computing database over a network, the parsing information associated with the second file format;
instantiating, using the parsing information associated with the second file format, a parser associated with the second file format for parsing files having the second file format and,
parsing using the parser associated with the second file format the at least one second file having the second file format.

2. The method as in claim 1, further comprising:
identifying a request to execute the nested file, the nested file including a primary file and at least one secondary file nested within the primary file.

3. The method as in claim 1, wherein the maliciousness score of the parsed primary file indicates a level of confidence that the parsed primary file contains malicious content and wherein the maliciousness score of the parsed at least one secondary file indicates a level of confidence that the parsed at least one secondary file primary file contains malicious content.

4. The method as in claim 1, further comprising:
exploring the content of the parsed primary file and the at least one secondary file nested within the primary file.

5. The method as in claim 1, wherein the primary file has a first file format and the at least one secondary file has a second file format and parsing the primary file and the at least one secondary file comprises:
parsing, using a parser associated with the first file format, the primary file; and,
parsing, using a parser associated with the second file format, the at least one secondary file.

6. The method as in claim 1, wherein the primary file has a primary file format satisfying a plurality of file formats, and parsing the primary file comprises:
individually parsing the primary file with parsers associated with each of the file formats satisfied by the primary file; and,
assigning, using the cell, a maliciousness score to the primary file based on the parsing of the primary file with each of the parsers associated with each of the file formats satisfied by the primary file.

7. The method as in claim 1, wherein the one or more secondary files has a secondary file format satisfying a plurality of file formats, and parsing the one or more secondary files comprises:
individually parsing the one or more secondary files with parsers associated with each of the formats satisfied by the one or more secondary files; and,
assigning, using the cell, a maliciousness score to the one or more secondary files based each parsing of the one or more secondary files.

8. The method as in claim 1, wherein the maliciousness score is generated using one or more machine learning models.

9. The method as in claim 1, wherein the primary file has a first file format and the at least one secondary file includes a second file having a second file format and a third file having a third file format.

10. The method as in claim 9, wherein the third file is nested within the second file.

11. The method as in claim 1, wherein the computing system is an enterprise server and/or a client device configured to communicate with the enterprise server.

12. The method as in claim 1, wherein the cell is operated by a secure operating environment logically separate from a primary operating environment of the computer system.

13. The method as in claim 1, wherein the cell comprises:
one or more parsers; and,
a dispatcher configured to dispatch at least a portion of the nested file to the one or more parsers; and, a file interface configured to interface between the cell and a computing platform, the file interface configured to expose one or more functions of the cell to the computing platform to receive the nested file from the computing platform and provide information associated with the nested file to the computing platform.

14. The method as in claim 1, wherein one or more of the operations are performed in a static environment.

15. The method as in claim 1, wherein one or more of the operations are performed in a dynamic environment.

16. The method as in claim 15, wherein the dynamic environment includes a secure operating environment separate from a primary operating environment of the computing system.

17. The method as in claim 1, wherein the overall maliciousness score for the nested file is generated in response to a maliciousness score assigned to one of the primary file or the at least one secondary file meeting a predefined criteria.

18. A system for processing a nested file having a primary file and at least one secondary embedded within the primary file, the system comprising:
at least one programmable processor;
a machine-readable medium storing instructions that, when executed by the at least one programmable processor, cause the at least one programmable processor to perform operations comprising:
parsing, using at least one parser of a cell, both of the primary file and the at least one secondary file;
assigning, using the cell, a maliciousness score for the parsed primary file and the parsed at least one secondary file;
generating, by the cell, an overall maliciousness score for the nested file, the overall maliciousness score based on the assigned maliciousness score for at least one of the parsed primary file and the parsed at least one secondary file, the overall maliciousness score indicating a level of confidence that the nested file contains malicious content; and
providing, the overall maliciousness score to a data consumer indicating whether to proceed with consuming the nested file;
wherein the at least one secondary file has a second file format unknown to the cell and the operations further comprise:
identifying, by the cell, that the second file format is unknown to the cell;
requesting, from a cloud service accessed over a network, parsing information associated with the second file format;

receiving, from the cloud computing database over a network, the parsing information associated with the second file format;

instantiating, using the parsing information associated with the second file format, a parser associated with the second file format for parsing files having the second file format; and parsing using the parser associated with the second file format the at least one second file having the second file format.

19. The system as in claim 18, wherein the operations further comprise:

identifying a request to execute the nested file, the nested file including a primary file and at least one secondary file nested within the primary file.

20. The system as in claim 18, wherein the maliciousness score of the parsed primary file indicates a level of confidence that the parsed primary file contains malicious content and the maliciousness score of the parsed at least one secondary file indicates a level of confidence that the parsed at least one secondary file primary file contains malicious content.

21. The system as in claim 18, wherein the operations further comprise:

exploring the content of the parsed primary file and the at least one secondary file nested within the primary file.

22. The system as in claim 18, wherein the primary file has a first file format and the at least one secondary file has a second file format and parsing the primary file and the at least one secondary file comprises:

parsing, using a parser associated with the first file format, the primary file; and, parsing, using a parser associated with the second file format, the at least one secondary file.

23. The system as in claim 18, wherein the primary file has a primary file format satisfying a plurality of file formats, and parsing the primary file comprises:

individually parsing the primary file with parsers associated with each of the file formats satisfied by the primary file; and, assigning, using the cell, a maliciousness score to the primary file based on the parsing of the primary file with each of the parsers associated with each of the file formats satisfied by the primary file.

24. The system as in claim 18, wherein the one or more secondary files has a secondary file format satisfying a plurality of file formats, and parsing the one or more secondary files comprises:

individually parsing the one or more secondary files with parsers associated with each of the formats satisfied by the one or more secondary files; and, assigning, using the cell, a maliciousness score to the one or more secondary files based each parsing of the one or more secondary files.

25. The system as in claim 18, wherein the maliciousness score is generated using one or more machine learning models.

26. The system as in claim 18, wherein the primary file has a first file format and the at least one secondary file includes a second file having a second file format and a third file having a third file format.

27. The system as in claim 26, wherein the third file is nested within the second file.

28. The system as in claim 18, wherein the computing system is an enterprise server and/or a client device configured to communicate with the enterprise server.

29. The system as in claim 18, wherein the cell is operated by a secure operating environment logically separate from a primary operating environment of the computer system.

30. The system as in claim 18, wherein the cell comprises:

one or more parsers; and, a dispatcher configured to dispatch at least a portion of the nested file to the one or more parsers; and, a file interface configured to interface between the cell and a computing platform, the file interface configured to expose one or more functions of the cell to the computing platform to receive the nested file from the computing platform and provide information associated with the nested file to the computing platform.

31. The system as in claim 18, wherein one or more of the operations are performed in a static environment.

32. The system as in claim 18, wherein one or more of the operations are performed in a dynamic environment.

33. The system as in claim 32, wherein the dynamic environment includes a secure operating environment separate from a primary operating environment of the computing system.

34. The system as in claim 18, wherein the overall maliciousness score for the nested file is generated in response to a maliciousness score assigned to one of the primary file or the at least one secondary file meeting a predefined criteria.

35. A non-transitory machine-readable medium for processing a nested file having a primary file and at least one secondary embedded within the primary file and operable to cause one or more computers to result in operations comprising:

parsing, using at least one parser of a cell, both of the primary file and the at least one secondary file;

assigning, using the cell, a maliciousness score for the parsed primary file and the parsed at least one secondary file;

generating, by the cell, an overall maliciousness score for the nested file, the overall maliciousness score based on at least one of the assigned maliciousness score for the parsed primary file and the parsed at least one secondary file, the overall maliciousness score indicating a level of confidence that the nested file contains malicious content; and providing, the overall maliciousness score to a data consumer indicating whether to proceed with consuming the nested file;

wherein the at least one secondary file has a second file format unknown to the cell and the operations further comprise:

identifying, by the cell, that the second file format is unknown to the cell;

requesting, from a cloud service accessed over a network, parsing information associated with the second file format;

receiving, from the cloud computing database over a network, the parsing information associated with the second file format;

instantiating, using the parsing information associated with the second file format, a parser associated with the second file format for parsing files having the second file format; and, parsing using the parser associated with the second file format the at least one second file having the second file format.

36. The non-transitory machine-readable medium as in claim 35, wherein the cell comprises:

one or more parsers; and, a dispatcher configured to dispatch at least a portion of the nested file to the one or more parsers; and, a file interface configured to interface between the cell and a computing platform, the file interface configured to expose one or more functions of the cell to the computing platform to receive the nested file from the computing platform and provide information associated with the nested file to the computing platform.

* * * * *